United States Patent
Inoue et al.

(10) Patent No.: US 6,665,255 B1
(45) Date of Patent: Dec. 16, 2003

(54) RECORDING REPRODUCING APPARATUS

(75) Inventors: Akiyoshi Inoue, Saitama-ken (JP); Yasumitsu Suzuki, Saitama-ken (JP)

(73) Assignee: Pioneer Corporation, Tokyo (JP)

( * ) Notice: Subject to any disclaimer, the term of this patent is extended or adjusted under 35 U.S.C. 154(b) by 0 days.

(21) Appl. No.: 09/499,747

(22) Filed: Feb. 8, 2000

(30) Foreign Application Priority Data

Feb. 8, 1999  (JP) .......................................... 11-029868

(51) Int. Cl.[7] .......................... G11B 33/02; G11B 17/30
(52) U.S. Cl. ...................................... 369/77.1; 369/219
(58) Field of Search .............................. 369/75.1–75.2, 369/77.1–77.2, 244, 191, 219, 192, 178, 215, 54, 58, 44.32, 44.27, 50

(56) References Cited

U.S. PATENT DOCUMENTS

| | | | |
|---|---|---|---|
| 5,031,169 A | * 7/1991 | Kato et al. .................. | 369/71.1 |
| 5,245,602 A | * 9/1993 | Ikedo et al. ................ | 369/77.1 |
| 5,572,498 A | * 11/1996 | Choi .......................... | 369/75.2 |
| 5,684,773 A | * 11/1997 | Hayashi ....................... | 369/59 |
| 5,719,848 A | * 2/1998 | Ikegame ....................... | 369/219 |
| 5,862,119 A | * 1/1999 | Nishijima et al. ........... | 369/192 |
| 5,867,338 A | * 2/1999 | Ohira et al. ................. | 369/75.2 |
| 5,901,129 A | * 5/1999 | Takahashi et al. ........... | 369/75.2 |
| 5,970,035 A | * 10/1999 | Ohmori et al. ................ | 369/54 |
| 5,986,991 A | * 11/1999 | Kawahara et al. ........... | 369/75.1 |
| 6,044,058 A | * 3/2000 | Miyazaki et al. ............ | 369/75.2 |
| 6,064,640 A | * 5/2000 | Shinoda et al. .............. | 369/75.2 |
| 6,314,073 B2 | * 11/2001 | Horie ......................... | 369/77.2 |
| 6,424,605 B1 | * 7/2002 | Iida ........................... | 369/44.27 |

* cited by examiner

*Primary Examiner*—Allen Cao
(74) *Attorney, Agent, or Firm*—Arent Fox Kintner Plotkin & Kahn

(57) ABSTRACT

There is provided a recording reproducing apparatus which is ready for use of recording media different in form and mode. The apparatus is comprised of a mounting member 5 in a rotatable manner toward a clamping position CL, another mounting member 6 arranged in the mounting member 5 in a rotatable manner, cam members 11, 12 for rotating the mounting member 5, and a cam block 32 for rotating the mounting member 6. The mounting member 5 mounts thereon a turn table 2 for clamping the recording medium, and an optical pickup 3, and the mounting member 6 mounts thereon another optical pickup 4. When an open recording medium DS is inserted, the mounting members 5, 6 are rotated to be horizontal to the clamping position CL, whereby the optical pickup 4 carries out recording or reproduction of information. On the other hand, when a cartridge type recording medium CDS is placed, the mounting member 5 is rotated to be horizontal to the clamping position CL, whereby the optical pickup 3 carries out recording or reproduction of information. During the recording or reproduction, the mounting member 6 is rotated in a direction away from the cartridge type recording medium CDS, to thereby keep the optical pickup 4 from contact with the same.

10 Claims, 6 Drawing Sheets

RECORDING REPRODUCING APPARATUS

BACKGROUND OF THE INVENTION

This invention relates to a recording reproducing apparatus which is ready for use of recording media, such as CD's and DVD's, and more particularly to a recording reproducing apparatus of this kind, which carries out recording or reproduction of information by using recording media which are different in form and mode from each other.

There is conventionally known a recording reproducing apparatus which optically records or reproduces information on or from recording media (hereinafter referred to as "the optical discs"), such as CD's (compact discs) and DVD's (digital video discs or digital versatile discs) by using an optical pickup. On the other hand, various types of optical discs have been developed which are different in form and mode, such as a cartridge type optical disc which is formed by a cartridge case and an essential optical disc housed therein, or an optical disc which is not housed in the cartridge case and used in an open state.

Since the various types of the optical discs which are different in form and mode have been developed, a recording reproducing apparatus which is ready for selective use of the various types of the optical discs, i.e. a recording reproducing apparatus with so-called compatibility, have been desired.

To implement the recording reproducing apparatus with compatibility, however, if the apparatus combines a recording reproducing mechanism exclusively ready for the open optical disc, and a recording reproducing mechanism exclusively ready for the cartridge type optical disc, not only the entire apparatus is upsized but also the number of component elements forming the apparatus is increased, which results in high cost of the apparatus.

Further, there is an idea that sharing part of a single recording reproducing mechanism by optical discs having different forms and modes is more contributable to downsizing of the recording reproducing apparatus and reduction in the number of component parts than provision of a plurality of recording reproducing mechanisms which are exclusively ready for different optical discs. In sharing part of the apparatus, however, to maintain and improve positioning accuracy of an optical pickup with respect to the optical disc is difficult, which is a large problem to be solved.

SUMMARY OF THE INVENTION

It is therefore an object of the present invention to provide a recording reproducing apparatus which has compatibility with various types of optical discs, and is capable of reducing the number of component parts forming the apparatus and hence downsizing the apparatus, as well as improving the accuracy of recording and reproduction of information.

To attain the above object, the present invention provides a recording reproducing apparatus which is ready for use of either of a cartridge type recording medium and an open recording medium, the apparatus comprising placing means for placing either of the cartridge type recording medium and the open recording medium on a clamping position in a removable manner, a first optical pickup for recording or reproducing information on or from the cartridge type recording medium to be placed on the placing means, a second optical pickup for recording or reproducing information on or from the open recording medium to be placed on the placing means, and moving means for moving the second optical pickup to a position away from the cartridge type recording medium when recording or reproducing information on or from the cartridge type recording medium by means of the first optical pickup.

According to the construction, when the cartridge type recording medium which is thicker than the open recording medium is inserted into the apparatus and placed on the predetermined clamping position, the first optical pickup is positioned to the cartridge type recording medium while the second optical pickup is separated from the cartridge type recording medium.

On the other hand, when the open recording medium is placed on the clamping position, the first and second optical pickups are positioned to the open recording medium. Further, when the cartridge type recording medium is placed, the recording or reproduction is carried out by the first optical pickup, while when the open recording medium is placed, the recording or reproduction is carried out by the second optical pickup.

Preferably, the first and second optical pickups are arranged side by side across the placing means, the moving means being comprised of a first mounting member which mounts thereon the placing means and the first optical pickup, and a second mounting member which mounts thereon the second optical pickup, the first mounting member having one end thereof on one side of the first optical pickup opposite to the placing means, the first mounting member being supported at the one end in a rotatable manner, the second mounting member being supported in the vicinity of the placing means in a rotatable manner.

According to the construction, when the cartridge type recording medium which is thicker than the open recording medium is inserted into the apparatus and placed on the predetermined clamping position, the first optical pickup is positioned to the cartridge type recording medium by the rotation of the first mounting member, and the second optical pickup is separated from the cartridge type recording medium by the rotation of the second mounting member. On the other hand, when the open recording medium is placed on the clamping position, the first and second mounting members are rotated toward the clamping position, whereby the first and second optical pickups can be positioned to the open recording medium. Further, when the cartridge type recording medium is placed, the recording or reproduction is carried out by the first optical pickup, while when the open recording medium is placed, the recording or reproduction is carried out by the second optical pickup.

The above and other objects, features and advantages of the invention will be more apparent from the following detailed description taken in conjunction with the accompanying drawings.

DETAILED DESCRIPTION OF THE PREFERRED EMBODIMENTS

Figure 1:
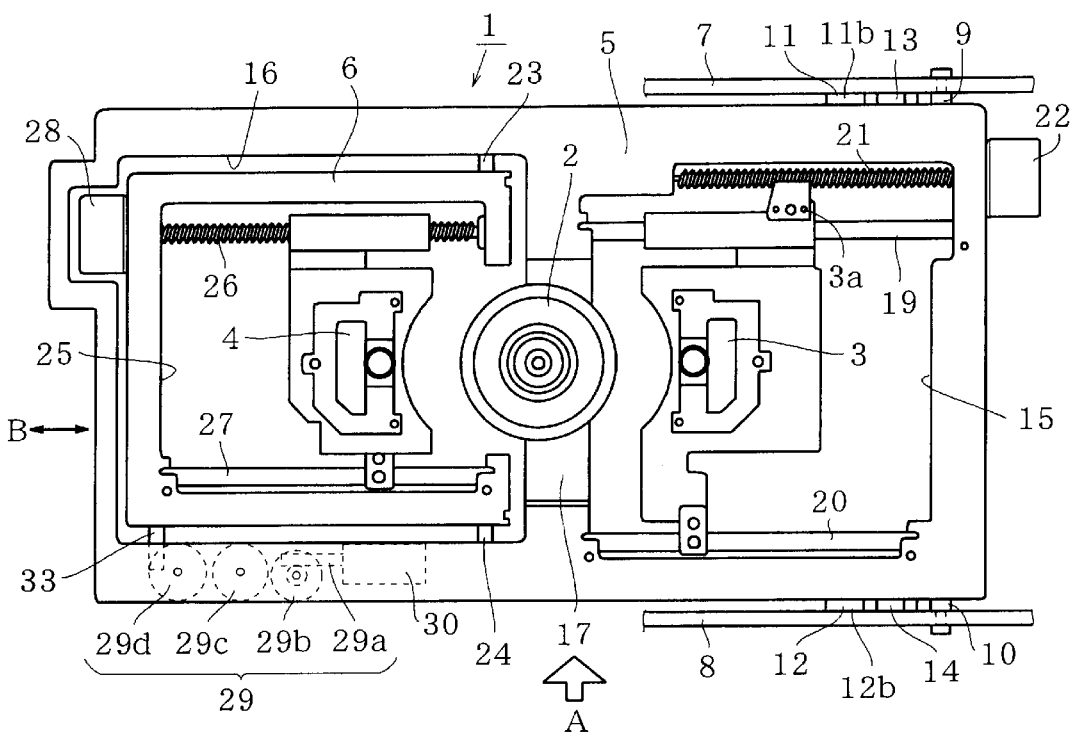
FIG. 1 is a plan view showing the construction of a recording reproducing mechanism according to an embodiment of the invention.
Figure 2:
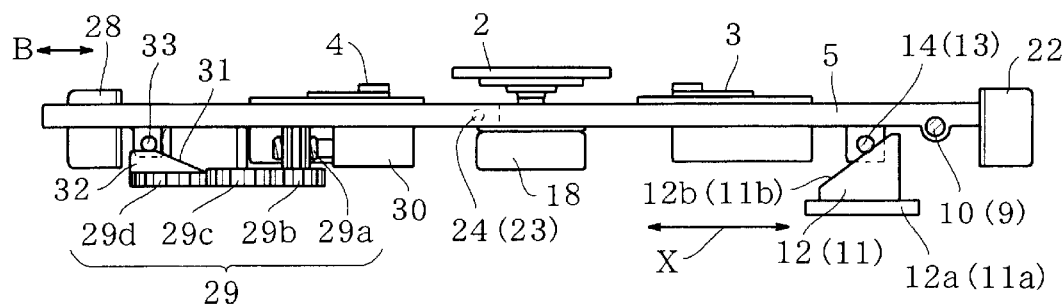
FIG. 2 is a side view showing the construction of the recording reproducing mechanism of FIG. 1.

The present invention will now be described in detail with reference to the drawings showing embodiments thereof. FIG. 1 is a plan view schematically showing the construction of a recording reproducing mechanism 1 which is provided for the recording reproducing apparatus according to the embodiment of the present invention. FIG. 2 is a side view showing the construction of the recording reproducing mechanism 1 as viewed in a direction of an arrow A in FIG. 1.

In FIG. 1, the recording reproducing mechanism 1 is comprised of a turn table 2 as placing means for placing an optical disc at a clamping position thereof, first and second optical pickups 3, 4 which are individually operated, a first mounting member 5 formed by a large and substantially rectangular plate, and a second mounting member 6 formed by a small and substantially rectangular plate.

The first mounting member 5 is arranged between side walls 7, 8 which vertically stand in a chassis (notshown) of the recording reproducing apparatus, and are supported by support shafts 9, 10 in a rotatable manner. As shown in FIG. 2, arranged between the first mounting member 5 and the respective side walls 7, 8 are substantially triangular cam members 11, 12, respectively. These cam members 11, 12 are guided by respective guide members 11a, 12a secured on the chassis, whereby the cam members are horizontally moved in one body. Further, the first mounting member 5 has engaging projections 13, 14 projecting from its side surfaces, respectively, which projections are in sliding contact with slanting surfaces 11b, 12b, of the cam members 11, 12, respectively.

The cam members 11, 12 are driven by an actuator having a driving motor and a gear mechanism, neither of which is shown, and guided by the guide members 11a, 12a, to thereby move forward and backward along the horizontal direction X. When the positions of the cam members 11, 12 in the horizontal direction X are changed by operating the actuator, contact positions of the engaging projections 13, 14 with the slanting surfaces 11b, 12b are changed, and according to the change of the contact positions, the height of the engaging projections 13, 14 is changed. As a result, the first mounting member 5 is rotatably supported about the support shafts 9, 10.

The range in which the cam members 11, 12 are moved in the horizontal direction X is determined beforehand. The first mounting member 5 assumes a horizontal position when the cam members 11, 12 are moved to locations most separate from the support shafts 9, 10. On the other hand, the mounting member 5 is rotated downward and assumes a position slanted at a maximum angle θmx1 with respect to the horizontal plane when the cam members 11, 12 are moved to locations closest to the support shafts 9, 10.

The first mounting member 5 has substantially rectangular openings 15, 16 formed therein. These openings 15, 16 form a bridge portion 17 therebetween, on which is arranged the turn table 2. The bridge portion 17 has a rear side surface on which is disposed a spindle motor 18. The turn table 2 is directly supported by the spindle motor 18 by means of its driving shaft, and the thus supported turn table 2 is constructed so as to place a cartridge type optical disc CDS which is formed by a cartridge case and an essential optical disc housed therein, and an open optical disc DS. More specifically, an upper edge of the turn table 2 is fitted into a clamping area provided in each of the cartridge type optical disc CDS and the open optical disc DS, whereby either of the optical discs DS, CDS is placed on the turn table 2.

Arranged in the opening 15 is the first optical pickup 3 in a manner being movable with respect to the turn table 2. More specifically, as shown in FIG. 1, the first mounting member 5 is provided with guide shafts 19, 20 and a screw shaft 21 which are arranged in parallel with each other. Thus, the first optical pickup 3 is supported by the guide shafts 19, 20 in a slidable manner, and a rack 3a arranged at one end of the first optical pickup 3 engages with a screw face of the screw shaft 21. Further, a driving motor 22 is arranged on an end of the mounting member 5, such that the screw shaft 21 has its end linked to a driving shaft of the driving motor 22.

When the screw shaft 21 is rotated by a driving force of the driving motor 22, the first optical pickup 3 is moved according to a rotational quantity of the screw shaft toward the turn table 2 within the opening 15 along the guide shafts 19, 20.

Arranged in the opening 16 is the second optical pickup 4 which is mounted in the second mounting member 6, in a manner being movable with respect to the turn table 2. More specifically, the second mounting member 6 is supported by support shafts 23, 24 projecting from an internal wall of the opening 16 at respective locations closer to the turn table 2, so as to be rotatable about the support shafts 23, 24. Further, the second mounting member 6 has formed therein a rectangular opening 25 substantially similar to the opening 16, in which opening a screw shaft 26 and a guide shaft 27 extend in parallel with each other. Further, a driving motor 28 is arranged on an end of the second mounting member 6, such that the screw shaft 26 has its end linked to a driving shaft of the driving motor 28.

The second optical pickup 4 has an end thereof engaged with the screw shaft 26, and the other end thereof slidably supported by the guide shaft 27. When the screw shaft 26 is rotated by a driving force of the driving motor 28, the second optical pickup 4 is moved according to a rotational quantity of the screw shaft toward the turn table 2 within the rectangular opening 25 along the screw shaft 26 and the guide shaft 27.

Arranged on a rear surface of the first mounting member 5 on the side closer to the opening 16 are a gear mechanism formed by gears 29a to 29d, and a driving motor 30. The worm gear 29a linked to a driving shaft of the driving motor 30 is engaged with the gear 29b, and further the gears 29b and 29c, and the gears 29c and 29d are engaged with each other, respectively.

Figure 3:
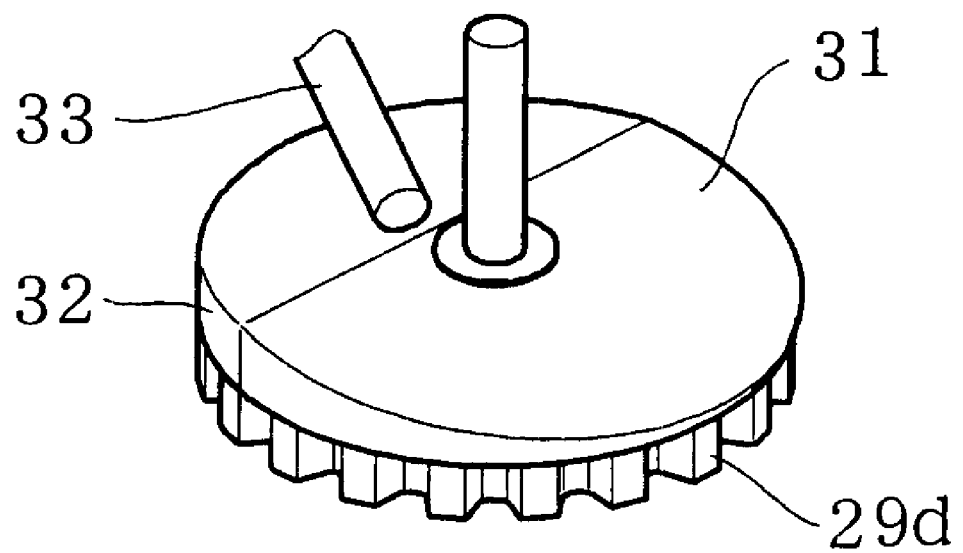
FIG. 3 is a perspective view showing the construction of a cam block appearing in FIG. 2.

As shown in a perspective view of FIG. 3, the gear 29d has an upper surface on which a cam block 32 is integrally molded such that a tapered surface 31 thereof faces the rear surface of the first mounting member 5. Further, the second mounting member 6 has an engaging projection 33 projecting from a side edge thereof, so as to make a sliding contact with the upper surface of the cam block 32.

When the gear mechanism 29 is activated by a driving force of the driving motor 30 and accordingly the cam block 32 is rotated, the position at which the engaging projection 33 is in contact with the tapered surface 31 of the cam block 32 is changed, and according to the change, the height of the engaging projection 33 is changed. As a result, the second mounting member 6 is rotated about the support shafts 23, 24. More specifically, the second mounting member 6 is supported by the first mounting member 5 by way of the support shafts 23, 24, while the cam block 32 is disposed on the rear surface of the first mounting member 5. Therefore, when the contact position of the engaging projection 33 with the cam block 32 is changed, the second mounting member 6 is rotatably with respect to the first mounting member 5.

Further, when the engaging projection 33 is positioned to the top of the cam block 32, the second mounting member 6 is aligned with the first mounting member 5. On the other hand, when the engaging projection 33 moves to the lowest end of the tapered surface 31 of the cam block 32, the second mounting member 6 is rotated and slanted downward at a maximum angle θmx2 with respect to the first mounting member 5.

Still further, a disc insertion port, not shown in FIGS. 1 nor 2, is arranged at an upper left portion of the recording reproducing mechanism 1, i.e. at a portion closer to the second mounting member 6, in order to insert and eject either of the open optical disc DS and the cartridge type optical disc CDS. Arranged at a location between the disc insertion port and the turn table 2 is a carrier mechanism for forward carrying (loading) and backward carrying (unloading) either of the open optical disc DS and the cartridge type optical disc CDS in the directions of an arrow B through a carriage passage in a manner maintaining the disc to a horizontal position. In addition, sensors 38, 39, referred to hereinafter, are arranged on the carriage passage.

Figure 4:
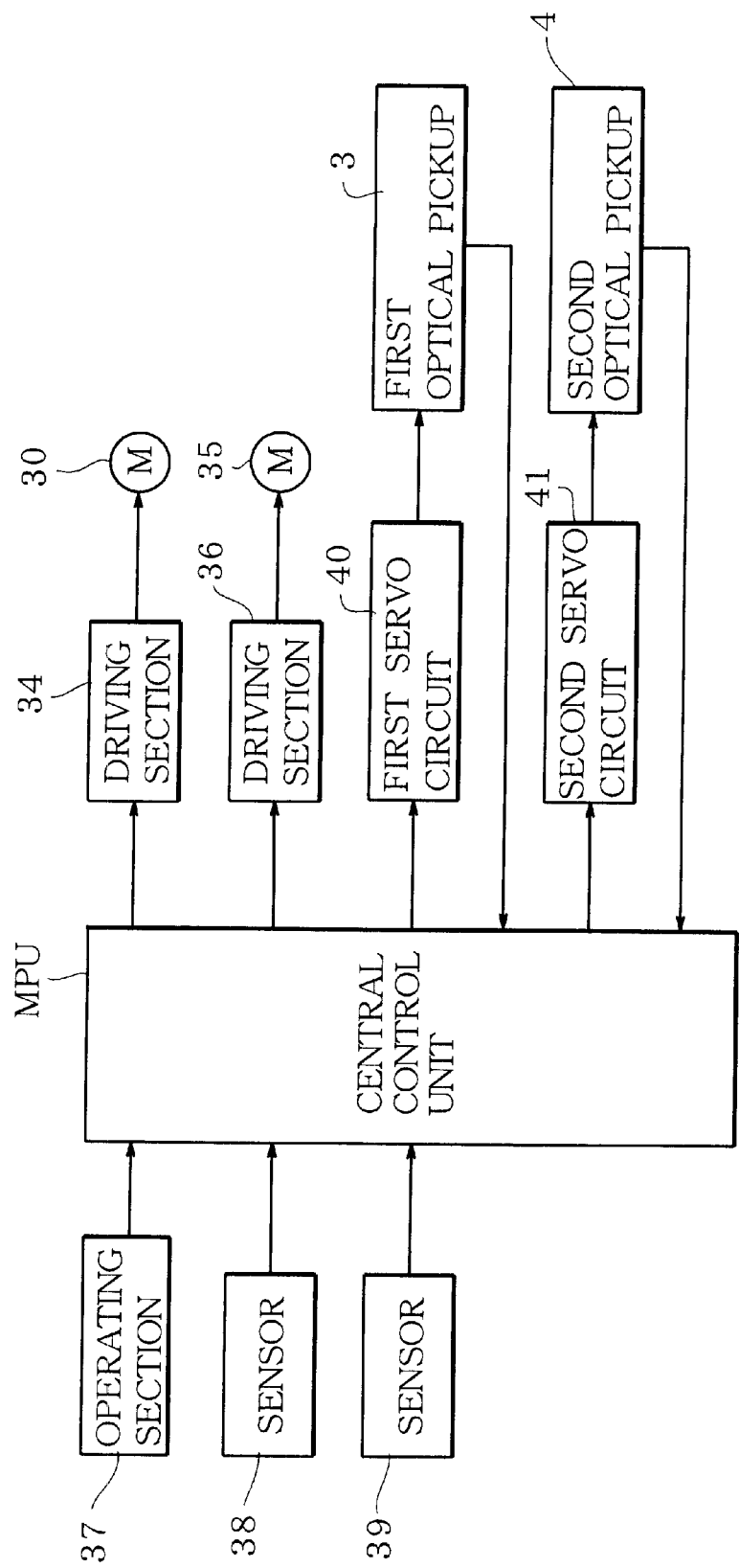
FIG. 4 is a block diagram showing the arrangement of a control circuit for controlling the recording reproducing mechanism shown in FIGS. 1 and 2.

FIG. 4 is a block diagram showing the arrangement of a control circuit for controlling the recording reproducing mechanism 1 of the embodiment. The control circuit is comprised of a central control unit MPU provided with a microprocessor unit for controlling the recording reproducing mechanism 1 according to a preset system program.

Electrically connected to the central control unit MPU are a driving section 34 for supplying driving power to the driving motor 30, a driving section 36 for supplying driving power to a driving motor 35 which drives the cam members 11, 12, an operating section 37 provided with operating switches, etc. which are arranged on a console panel of the recording reproducing apparatus, and the sensors 38, 39, for detecting passage, etc. of the open optical disc DS, and the cartridge type optical disc CDS.

The sensor 38 is of an optical or a mechanical type one for detecting installation and ejection of either of the optical discs DS and CDS. More specifically, the sensor 38 detects every behavior of the optical disc DS, CDS from the start of the installation to the end of the same, as well as every behavior of the optical disc DS, CDS from the start of the ejection to the end of the same. Further, the central control unit MPU monitors every carrying state of the optical disc DS, CDS, based on detection signals indicative of the behavior of the optical disc. The sensor 39 is of an optical or a mechanical type one for detecting the difference in external shape between the open optical disc DS and the cartridge type optical disc CDS. The central control unit MPU determines the difference in the optical discs DS, CDS, based on a detection signal output from the sensor 39. Further, the central control unit MPU carries out control for optimum installation and ejection for each of the optical discs DS and CDS.

Further connected to the central control unit MPU are first and second servo circuits 40, 41, for servo-controlling the first and second optical pickups 3, 4, respectively. The first and second servo circuits 40, 41 carry out servo control of the spindle motor 18 and the driving motor 22, and the spindle motor 18 and the driving motor 28, respectively.

The open optical disc DS or the cartridge type optical disc CDS is carried through the disc insertion port, not shown, formed on the side closer to the arrow B indicated in FIGS. 1 and 2, and horizontally loaded on the turn table 2 or horizontally unloaded from the same. The sensors 38, 39 are arranged on the carriage passage through which the open optical disc DS and the cartridge type optical disc CDS pass. The disc insertion port is arranged in the console panel. Further arranged on the disc carriage passage is a loading mechanism, not shown, which performs a carrying operation, whereby either of the open optical disc DS and the cartridge type optical disc CDS is automatically loaded or unloaded.

Figure 5:
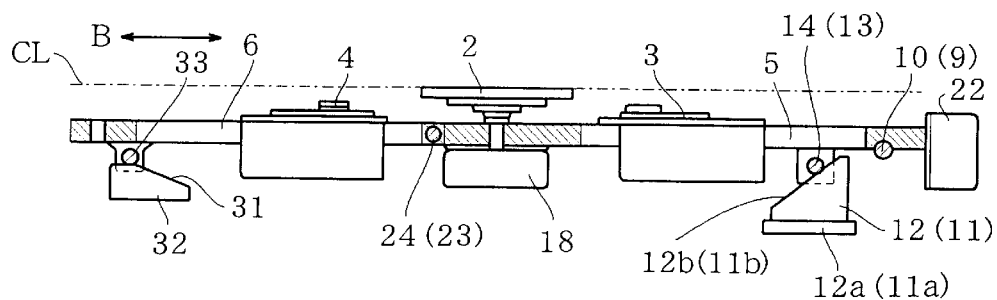
FIG. 5 is a side view showing the construction of the recording reproducing mechanism shown in FIGS. 1 and 2, which is useful in explaining a basic operation of the recording reproducing mechanism.
Figure 6:
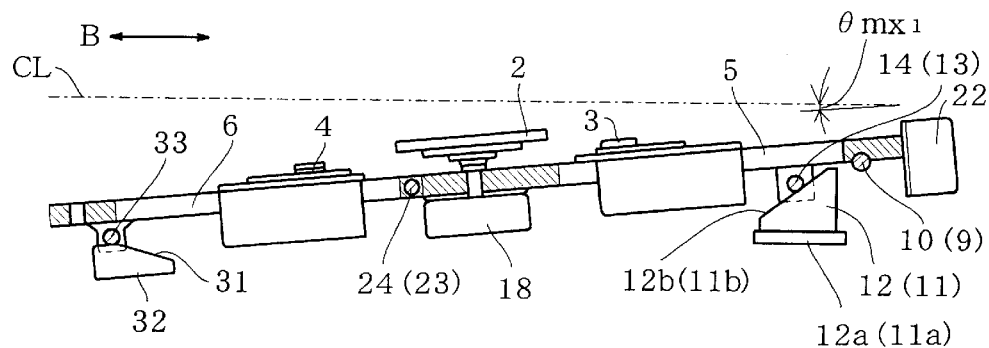
FIG. 6 is a side view showing the construction of the recording reproducing mechanism shown in FIGS. 1 and 2, which is useful in further explaining the basic operation of the mechanism.
Figure 7:
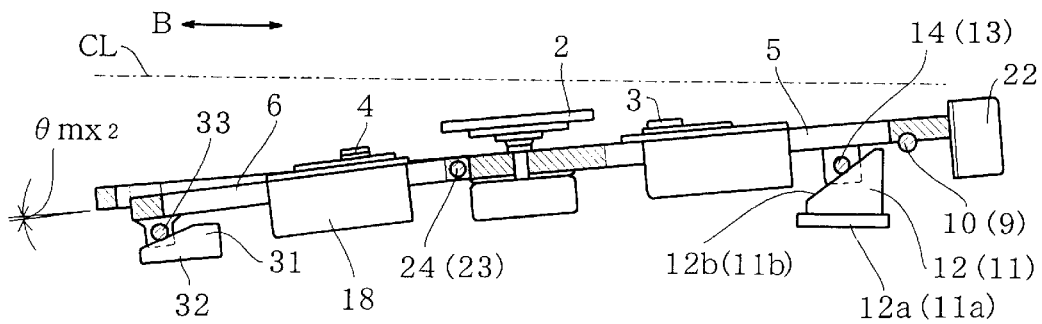
FIG. 7 is a side view showing the construction of the recording reproducing mechanism shown in FIGS. 1 and 2, which is useful in further explaining the basic operation of the mechanism.
Figure 8:
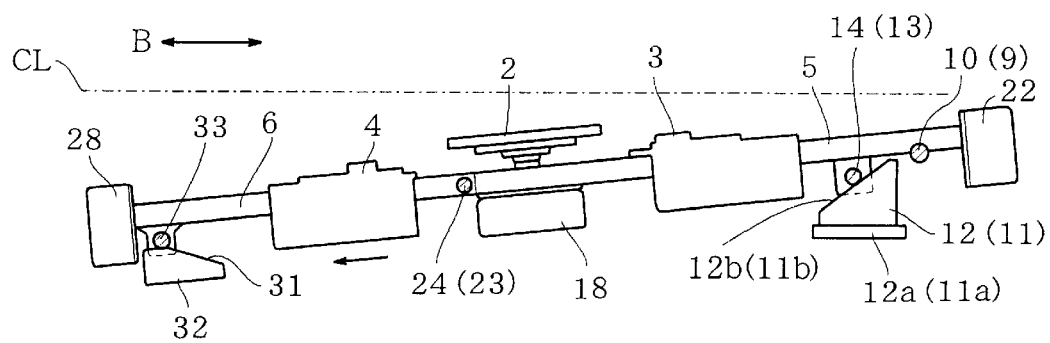
FIGS. 8A, 8B and 8C are side views each showing the construction of the recording reproducing mechanism shown in FIGS. 1 and 2, which are useful in explaining an operation of the recording reproducing mechanism when an open optical disc is inserted.
Figure 8:
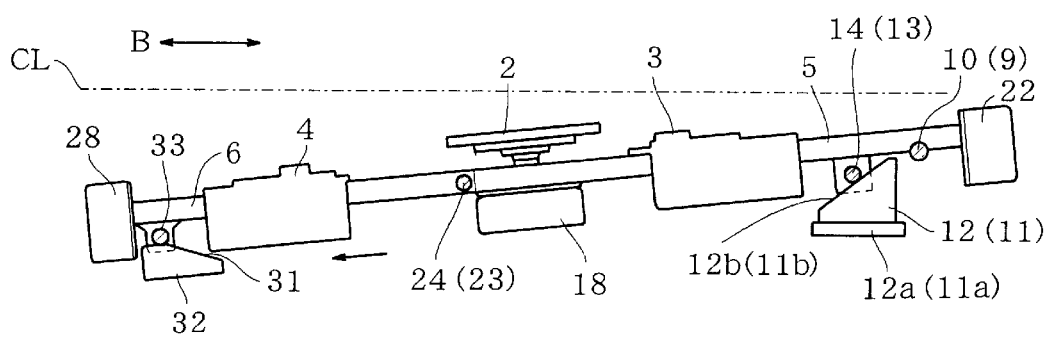
Figure 8:
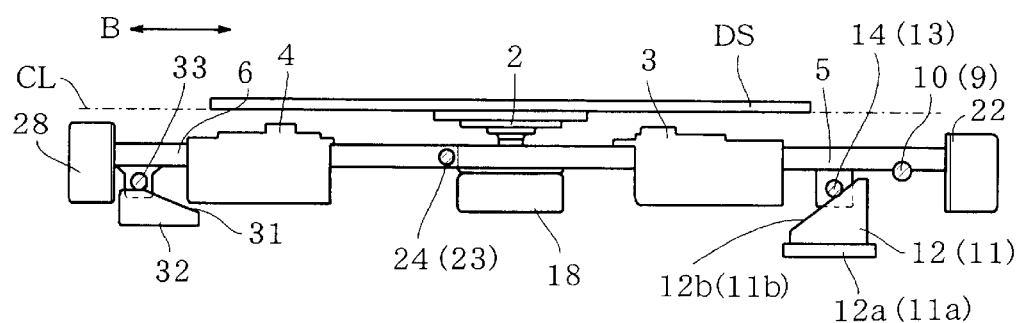
Figure 9:
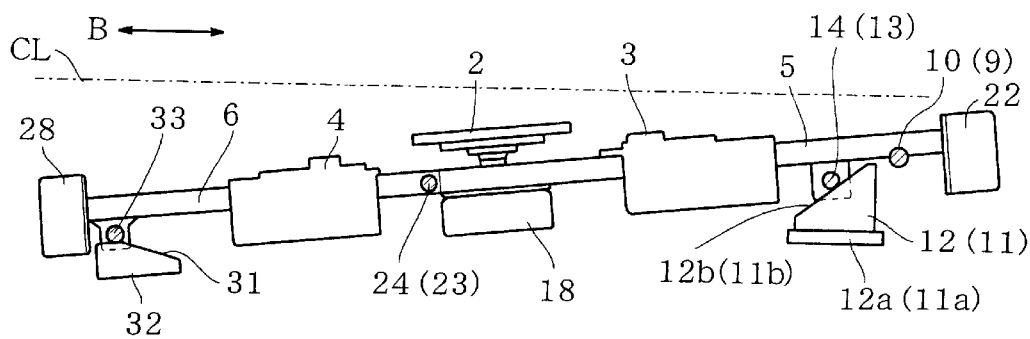
FIGS. 9A, 9B and 9C are side views each showing the construction of the recording reproducing mechanism shown in FIGS. 1 and 2, which are useful in explaining an operation of the recording reproducing mechanism when a cartridge type optical disc is inserted.
Figure 9:
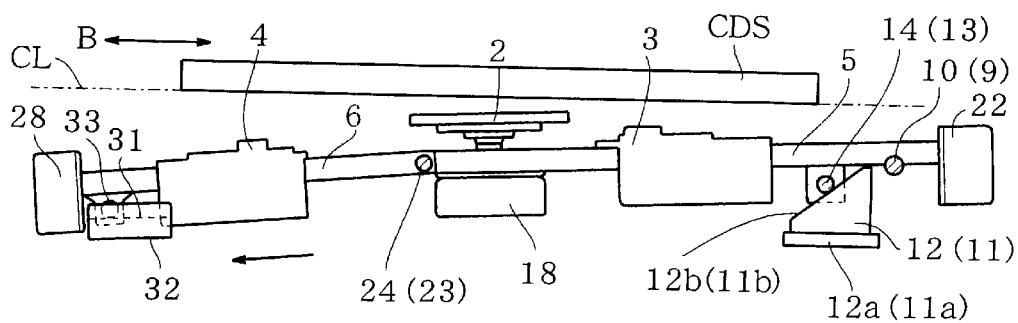
Figure 9:
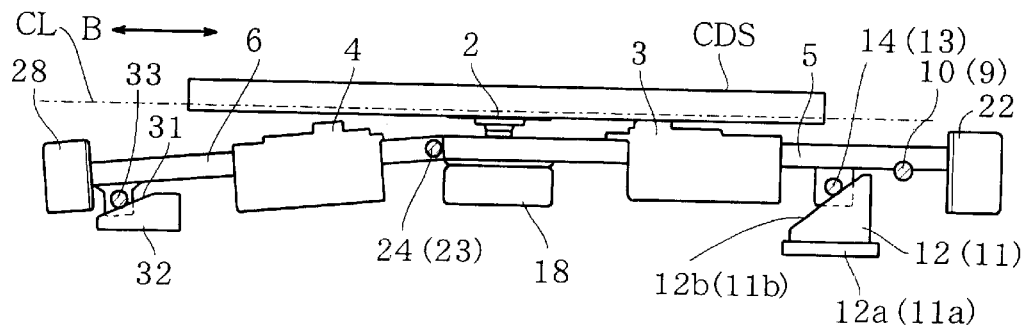

Next, description will be made of operations of the recording reproducing mechanism 1 having the above described construction, with reference to FIGS. 5 to 9. These figures are side views corresponding to FIG. 2. In these figures, FIGS. 5 to 7 show aspects of basic positions of the recording reproducing mechanism 1, while FIGS. 8A to 8C specifically show positions assumed when the open optical disc DS is inserted, and FIGS. 9A to 9C show positions assumed when the cartridge type optical disc CDS is inserted. The dashed line CL in each of FIGS. 5 to 9 indicates a plane on which the open optical disc DS and the cartridge type optical disc CDS are horizontally carried.

Referring to FIG. 5, when the cam members 11, 12 as viewed on the right side of the figure are moved to the locations most separate from the respective support shafts 9, 10, and at the same time the cam block 32 as viewed on the left side of the figure is rotated, the engaging projection 33 is positioned to the top of the cam block 32. Then, the first and second mounting members 5, 6 as moving means for moving the first and second optical pickups are held to respective horizontal positions.

When the cam members 11, 12 move from the locations shown in FIG. 5 to the locations closest to the support shafts 9, 10, the first and second mounting members 5, 6 are rotated and slanted downward in one body, at the angle θmx1, as shown in FIG. 6. According to the embodiment, when the recording reproducing mechanism 1 is in a standby state in which neither the open disc DS nor the cartridge type optical disc CDS is inserted (hereinafter simply referred to as "the non-clamping state"), the mechanism 1 assumes the position shown in FIG. 6.

When the cam block 32 is rotated from the state shown in FIG. 6 so that the engaging projection 33 is positioned to the lowest end of the tapered surface 31, the second mounting member 6 is rotated and slanted downward at the angle θmx2 with respect to the first mounting member 5, as shown in FIG. 7. That is, the first and second mounting members 5, 6 are in a state being bent at the support shafts 23, 24 as a fulcrum.

When the first and second mounting members 5, 6 are both rotated the maximum angles θmx1 and θmx2, respectively, the elevation angle at the support shafts 9, 10, which extends to a lower end of the driving motor 28 becomes large, and therefore the height of the recording reproducing apparatus must be enlarged. To cope with this inconvenience, according to the embodiment, the elevation angle is controlled so as to be limited to the maximum angle θmx1 even when the first and second mounting members 5, 6 are in the state being bent at the support shafts 23, 24, as shown in FIG. 7, to thereby realize the low-profile recording reproducing apparatus. The details of the control of the angles will be described hereinafter.

In regard of this point, if the slimming of the recording reproducing apparatus is not required, it is possible that the first and second mounting members 5, 6 are both rotated the maximum angles θmx1 and θmx2, respectively. In other words, the first and second mounting members 5, 6 should be rotated as appropriate according to the configuration of the recording reproducing apparatus. For instance, if the first mounting member 5 is slanted at the maximum angel θmx1 and the second mounting member 6 is further slanted at the maximum angel θmx2 with respect to the first mounting member 5, an interval between the horizontal plane indicated by the dashed line CL and the first and second mounting members 5, 6 becomes wider, whereby a space for carrying (installing and ejecting) the optical discs DS, CDS can be expanded. As a result, installation and ejection of the optical discs DS, CDS are facilitated.

Next, description will be made of an operation of the recording reproducing apparatus when the open disc DS is inserted, with reference to FIGS. 8A to 8C.

When the user or the like operates an operating button arranged in the operating section 37 to provide instructions of disc insertion, the first and second mounting members 5, 6 are rotated downward the angel θmx1 about the support shafts 9, 10, as shown in FIG. 8A, whereby the recording reproducing mechanism becomes in the non-clamping state. The state of the mechanism 1 shown in FIG. 8A is the same as in FIG. 6.

Then the second optical pickup 4 moves to the location closer to the driving motor 28, i.e. the location most separate from the turn table 2, as shown in FIG. 8B, in order to secure a space in which the disc DS does not collide with the second optical pickup 4 when inserted.

Further, since the second optical pickup 4 has moved to the location most separate from the turn table 2, the space required for inserting the disc DS is sufficiently secured without largely slanting the first and second mounting members 5, 6 with respect to the horizontal plane. Further, the low-profile of the entire apparatus can be realized.

When the open disc DS is inserted into the disc insertion port and placed at a predetermined clamping position on the turn table 2, the sensors 38, 39 detect the placement. Then, based on a result of the detection, the driving motor 35 moves the cam members 11, 12 to the locations most separate from the support shafts 9, 10.

As a result, as shown in FIG. 8C, the first and second mounting members 5, 6 both assume the horizontal positions, and the open disc DS is placed (clamped) on the turn table 2. Then, a recording reproducing surface of the open disc DS faces the second optical pickup 4 with an optimum interval for recording and reproducing information, to thereby achieve high positioning accuracy. Further, the central control unit MPU controls the spindle motor 18 and the second optical pickup 4, to thereby carry out recording or reproduction of information on or from the open optical disc DS.

On the other hand, when the user or the like operates an ejection operating button arranged in the operating section 37, the clamping state of the first and second mounting members 5, 6, shown in FIG. 8C, is changed to the non-clamping state, shown in FIG. 8A. Then, the open optical disc DS is automatically ejected to the disc insertion port by the carrier mechanism.

Next, description will be made of an operation of the recording reproducing apparatus when the cartridge type optical disc CDS is inserted, with reference to FIGS. 9A to 9C. When the user or the like operates the operating button arranged in the operating section 37 to provide instructions of disc insertion, the first and second mounting members 5, 6 are rotated downward the angel θmx1 about the support shafts 9, 10, as shown in FIG. 9A, whereby the recording reproducing mechanism becomes in the non-clamping state.

As is well known, the cartridge case of the cartridge type optical disc CDS has a shutter for exposing or shielding a recording reproducing surface of the essential optical disc housed therein. In the present embodiment, the optical disc is inserted into the disc insertion port such that an end of the cartridge case provided with the shutter is first inserted. When the cartridge type optical disc CDS is inserted in this manner, the carrier mechanism opens the shutter during its carriage.

As a result, when the cartridge type optical disc CDS is placed at the predetermined clamping position on the turn table 2, the shutter is held open, and part of the essential optical disc in the cartridge case is exposed to the first optical pickup 3 through a window which has been opened by the movement of the shutter.

When the cartridge type optical disc CDS is placed at the predetermined clamping position on the turn table 2, the placement is detected by the sensors 38, 39. Then, the driving motors 30, 35 are activated based on a result of the detection, whereby the cam members 11, 12 are moved and the cam block 32 is rotated.

Herein, as shown in FIG. 9B, as the cam members 11, 12 are moved so as to be progressively separate from the support shafts 9, 10, respectively, the first mounting member 3 is progressively rotated upward. Further, as the first mounting member 5 is progressively rotated upward, the second mounting member 6 is progressively rotated downward in synchronization with the rotation of first mounting member.

In regard of this point, the second mounting member 6 is progressively rotated downward about the support shafts 23, 24 such that the elevation angle at the support shafts 9, 10, which extends to the lower end of the driving motor 28 is limited to the maximum angle θmx1. More specifically, as the first mounting member 5 is progressively rotated upward and the angle formed by the horizontal plane indicated by the dashed line CL and the first mounting member 5 becomes smaller, the second mounting member 6 is rotated downward about the support shafts 23, 24 such that the elevation angle at the support shafts 9, 10, which extends to the lower end of the driving motor 28 is limited to the maximum angle θmx1.

When the first mounting member 5 is aligned with the horizontal plane indicated by the dashed line CL, as shown in FIG. 9C, the driving motors 30, 35 are stopped. As a result, the turn table 2 is fitted into a clamping area of the cartridge type optical disc CDS, and at the same time an upper end (a portion where an objective lens is arranged) of the first optical pickup 3 faces the essential optical disc housed in the cartridge case via the window thereof, whereby an interval between the recording reproducing surface of the essential optical disc and the first optical pickup 3 is set to an optimum value for recording or reproducing information.

In this manner, when the cartridge type optical disc CDS is inserted, the second mounting member 6 is rotated downward with respect to the first mounting member 5. As a result, an upper end (a portion where an objective lens is arranged) of the second optical pickup is prevented from colliding with an external rear surface of the cartridge case of the cartridge type optical disc CDS. In addition, since the first optical pickup 3 faces the essential optical disc housed in the cartridge case of the cartridge type optical disc CDS at the optimum interval, highly accurate recording or reproduction is carried out by the first optical pickup 3.

Next, when the user or the like operates the ejection operating button arranged in the operating section 37, the state of the first and second mounting members 5, 6 shown in FIG. 9C is changed to the state shown in FIG. 9B, and the non-clamping state shown in FIG. 9A, and then the cartridge type optical pickup CDS is automatically ejected toward the disc insertion port by the carrier mechanism.

As described hereinabove, according to the embodiment of the invention, when the open optical disc DS is inserted, by rotating the first and second mounting members 5, 6 in one body toward the clamping position, as shown in FIGS. 8A and 8B, the second optical pickup 4 can be positioned to the recording reproducing surface of the open optical disc DS.

On the other hand, when the cartridge type optical disc CDS is inserted, by rotating the first mounting member 5 toward the clamping position, the first optical pickup 3 is positioned to the recording reproducing surface of the optical disc DS in the cartridge type optical disc CDS. Further, by rotating the second mounting member 4 in a manner separating from the clamping position, colliding of the cartridge type optical disc CDS with the second optical pickup 4 can be prevented beforehand.

Still further, the first and second mounting members 5 and 6 are linked to each other in a relatively rotative manner by the supporting shafts 23, 24. Therefore, when the cartridge type optical disc CDS is inserted, the second mounting member is rotated downward, whereby the recording reproducing apparatus of the embodiment can be slimmed down.

If the second mounting member 6 was not rotative so that it was always rotated together with the first mounting member 5 in one body, the following inconvenience would be imposed: That is, when the cartridge type optical disc CDS was inserted, in order to prevent the second optical pickup from colliding with the cartridge type optical disc CDS, the second mounting member would require a moving mechanism, etc. provided therefor, for moving the second optical pickup up and down. However, such provision of the moving mechanism which is out of the scope of the embodiment, would require an extra space in the height direction, for moving the second optical pickup up and down, whereby formation of the low-profile apparatus is rendered difficult. Further, the number of component parts would be increased, which would be another inconvenience.

On the other hand, according to the present embodiment, slimming of the apparatus and reduction in number of the component elements are achieved by linking the first and second mounting members 5, 6 to each other in a relatively rotative manner by the support shafts 23, 24.

In the above described embodiment, when the apparatus is in the non-clamping state as shown in FIGS. 6, 8A, and 9A, the second optical pickup 4 is brought into a standstill at an arbitrary location. However, it is desirable that in the non-clamping state the second optical pickup 4 is moved to the location closest to the turn table 2 by the driving motor 28. In this manner, by moving the second optical pickup 4 to the location closest to the turn table 2, an interval between a lower end of the second optical pickup 4 and the chassis or the like can be set larger, which leads to further slimming of the apparatus and increased flexibility in designing of the apparatus.

Further, in the embodiment, the description has been made of the cam structures including the sliding type cam members 11, 12 for rotating the first mounting member 5, and the rotating type cam block 32 for rotating the second mounting member 6, but this is not limitative. Alternatively, other cam structures having the same function as that of the cam structures of the embodiment will be included in the present invention.

Still further, the recording reproducing apparatus of the invention is ready for use of not only a recording medium capable of recording and reproducing information, but also a recording medium only capable of reproducing information, and a recording medium only capable of recording information.

As described hereinabove, according to a recording reproducing apparatus of the present invention, when a cartridge type recording medium which is thicker than an open recording medium is inserted into the apparatus and placed on a predetermined clamping position, a first optical pickup is positioned to the cartridge type recording medium while a second optical pickup is separated from the cartridge type recording medium. As a result, the second optical pickup is prevented from colliding with the cartridge type recording medium, and therefore the first optical pickup carries out recording or reproduction of information on or from the cartridge type recording medium with high positioning accuracy. On the other hand, when an open recording medium is inserted into the apparatus and placed on the clamping position, the first and second optical pickups are positioned to the open recording medium, and the second optical pickup carries out recording or reproduction of information on or from the open recording medium with high positioning accuracy.

While there has been described what are at present considered to be preferred embodiments of the invention, it will be understood that various modifications may be made thereto, and it is intended that the appended claims cover all such modifications as fall within the true spirit and scope of the invention.

What is claimed is:

1. A recording reproducing apparatus which is ready for use of either of a cartridge type recording medium and an open recording medium, said apparatus comprising:

single placing means being able to directly and changeably place either of said cartridge type recording medium and said open recording medium at a clamping position thereon;

a first optical pickup for recording or reproducing information on or from said cartridge type recording medium to be placed on said placing means;

a second optical pickup for recording or reproducing information on or from said open recording medium to be placed on said placing means; and moving means for moving said second optical pickup to a position away from said cartridge type recording medium when recording or reproducing information on or from said cartridge type recording medium by means of said first optical pickup.

2. The recording reproducing apparatus according to claim 1, wherein
   said first and second optical pickups are arranged side by side across said placing means;
   said moving means is comprised of a first mounting member which mounts thereon said placing means and said first optical pickup, and a second mounting member which mounts thereon said second optical pickup;
   said first mounting member has one and thereof on one side of said first optical pickup opposite to said placing means, said first mounting member being supported at said one end in a rotatable manner; and
   said second mounting member are supported in the vicinity of said placing means in a rotatable manner.

3. The recording reproducing apparatus according to claim 2, wherein said second mounting member is supported by said first mounting member in a rotatable manner.

4. The recording reproducing apparatus according to claim 2, wherein
   said first mounting member responsive to placement of said cartridge type recording medium on said clamping position, rotates toward said recording medium, to thereby position said first optical pickup to said recording medium; and
   said second mounting member responsive to said placement, rotates away from said recording medium, to thereby separate said second optical pickup from said recording medium.

5. The recording reproducing apparatus according to claim 4, wherein
   said second optical pickup responsive to said placement of said cartridge type recording medium on said clamping position, moves closely toward said placing means and then to be rotated by second mounting member.

6. The recording reproducing apparatus according to claim 2, wherein
   said first and second mounting members are rotated away from said clamping position during a non-clamping state in which neither of said cartridge type recording medium nor said open recording medium is placed on said clamping position.

7. The recording reproducing apparatus according to claim 6, wherein
   said second optical pickup is moved closely toward said placing means during said non-clamping state in which neither of said cartridge type recording medium nor said open recording medium is placed on said clamping position.

8. The recording reproducing apparatus according to claim 1, wherein
   said second optical pickup is moved to a position away from said turn table when said open recording medium or said cartridge type recording medium is inserted into said apparatus.

9. A recording reproducing apparatus which is ready for use of either of a cartridge type recording medium and an open recording medium, said apparatus comprising:
   a turn table for placing either of said cartridge type recording medium and said open recording medium at a clamping position thereon in a removable manner;
   a first optical pickup for recording or reproducing information on or from said cartridge type recording medium to be placed on said turn table;
   a second optical pickup for recording or reproducing information on or from said open recording medium to be placed on said turn table; and
   moving means having a first mounting member which mounts thereon said turn table and said first optical pickup, and a second mounting member which mounts thereon said second optical pickup; wherein
      said first and second optical pickups are arranged side by side across said turn table;
      said first mounting member has one end thereof on one side of said first optical pickup opposite to said turn table, said first mounting member being supported at said one end in a rotatable manner; and
      said second mounting member are supported in the vicinity of said turn table in a rotatable manner.

10. The recording reproducing apparatus according to claim 9, wherein
    said moving means moves said second optical pickup to a position away from said cartridge type recording medium when recording or reproducing information on or from said cartridge type recording medium by means of said first optical pickup.

* * * * *